US008892519B2

(12) United States Patent
San Andres et al.

(10) Patent No.: US 8,892,519 B2
(45) Date of Patent: Nov. 18, 2014

(54) COMMAND INTERPRETER

(75) Inventors: Ramon Juan San Andres, Duluth, GA (US); Blaine Madison Mucklow, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 13/267,843

(22) Filed: Oct. 6, 2011

(65) Prior Publication Data
US 2013/0091107 A1   Apr. 11, 2013

(51) Int. Cl.
*G06F 17/30* (2006.01)

(52) U.S. Cl.
USPC .............................. 707/638; 707/694; 707/803

(58) Field of Classification Search
CPC ... G06F 17/3023; G06F 8/65; G06F 9/45512; Y10S 707/99954
USPC .......................................... 707/638, 694, 803
See application file for complete search history.

(56) References Cited

U.S. PATENT DOCUMENTS

| | | | | |
|---|---|---|---|---|
| 5,920,725 | A * | 7/1999 | Ma et al. | 707/999.202 |
| 6,886,018 | B1 * | 4/2005 | Boudris et al. | 707/625 |
| 2003/0188231 | A1 * | 10/2003 | Cronce | 714/38 |
| 2005/0262021 | A1 * | 11/2005 | Wood et al. | 705/44 |
| 2007/0219933 | A1 * | 9/2007 | Datig | 706/4 |
| 2009/0300077 | A1 * | 12/2009 | Shi et al. | 707/204 |

* cited by examiner

*Primary Examiner* — Vincent F Boccio
(74) *Attorney, Agent, or Firm* — Fletcher Yoder, P.C.

(57) ABSTRACT

A system includes a first computer configured to store and run a computer program. The computer program includes an internal interface with tangible machine-readable instructions stored on the first computer, to provide communications between the computer program and external computers and our computer processes. The system also includes a command interpreter configured to interface with the computer program through the internal interface. The command interpreter includes tangible machine-readable instructions to detect a script file; generate one or more command objects, interpretable by the internal interface, representative of a functionality defined in the script file; generate a command script comprising the generated command objects; and execute the command script by executing at least a portion of the machine-readable instructions in the internal interface.

11 Claims, 4 Drawing Sheets

COMMAND INTERPRETER

BACKGROUND OF THE INVENTION

The subject matter disclosed herein relates to computer programs, and more specifically, computer programs that utilize a command interpreter to provide run-time commands after the program has been developed.

Computer programs provide computer-implemented instructions useful for completing one or more goals. One such example of a distributed computer program may be a model versioning manager (MVM). An MVM is a software application that maintains a representation (model) of a system (e.g., a power distribution network). Updates to the model are submitted via multiple systems in a distributed network. The updates are sent in the form of jobs containing additions/deletions/modifications to the model. The MVM maintains the current state of the model as well as the historical changes that have taken place over time. The MVM system can thus provide the version of the entire model as it existed at a particular point in time. The MVM allows the exporting of a model version as a baseline (containing a snapshot of the model at a particular point) or as increments (which are applied to a particular version to bring the model to a new version).

Over time, it may be useful to implement features beyond those which were included in the design and implementation of the computer program. For example, maintenance procedures, control procedures, and/or reporting procedures may be desirable after the computer program has been designed and implemented. For example, in MVMs, the number of model modifications can become quite numerous. Accordingly, a large amount of storage may be necessary to store the model modifications. Thus, it may be desirable to add data purging functionality to the MVMs. Typically, such modification may occur through the use of standard services (e.g., web services). Unfortunately, in many situations, generating functionality using these services can be quite complex and time consuming Thus, in certain situations, the added functionality may not be worth the added complexity and time needed to implement the functionality. Further, updates made through these standard services are often times not expandable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a first computer configured to store and run a computer program, an internal interface comprising tangible machine-readable instructions stored on the first computer, wherein the internal interface is configured to provide communications between the computer program and external computers or computer processes, and a command interpreter configured to interface with the computer program through the internal interface, the command interpreter comprising tangible machine-readable instructions, stored on a second computer, configured to detect a script file, generate one or more command objects, interpretable by the internal interface, representative of functionality defined in the script file, generate a command script comprising the generated command objects, and execute the script by executing at least a portion of the machine-readable instructions in the internal interface.

In a second embodiment, a system includes a computer data access component, comprising tangible computer readable instructions stored on a computer, the computer data access component configured to store data in a version control system repository, a database, a file system or combination thereof, and provide exposed import and export operations of the version control system repository, database, file system or combination thereof to external computer programs, and a command interpreter, comprising tangible computer-readable instructions stored on a computer, the command interpreter configured to execute a script using at least the exposed import and export operations, wherein the script is configured to purge content in the version control system repository, the database, or both, that was created, modified, or both prior to a date specified in the script, while retaining content in the version control system repository, the database, or both, that was generated, modified, or both after the date specified in the script.

In a third embodiment, a method of purging data, including detecting, via a command interpreter implemented on a first computer, a script file, generating, via the command interpreter implemented on the first computer, a command script comprising tangible machine-readable instructions stored in a data storage to suspend a computer program, running on the first computer or a second computer, such that jobs sent to the computer program are not executed, determine what data related to the computer program should be preserved, export the data that should be preserved, delete all database tables and version control repositories not relating to configuration of the computer program, database tables, and version control repositories, import the exported data, and resume the computer program so that jobs sent to the computer program may be executed, and executing, via the command interpreter, the command script.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to computer systems that use a command interpreter to execute functions beyond those typically available in a set of implemented computer program instructions. The use of the command interpreter to implement supplemental functionality allows the computer system to be expandable (e.g., to be able to execute supplemental computer-readable instructions) while reducing complexity and time constraints necessary for alternative methods of adding such supplemental functionality to the computer program instructions of the computer system.

Figure 1:
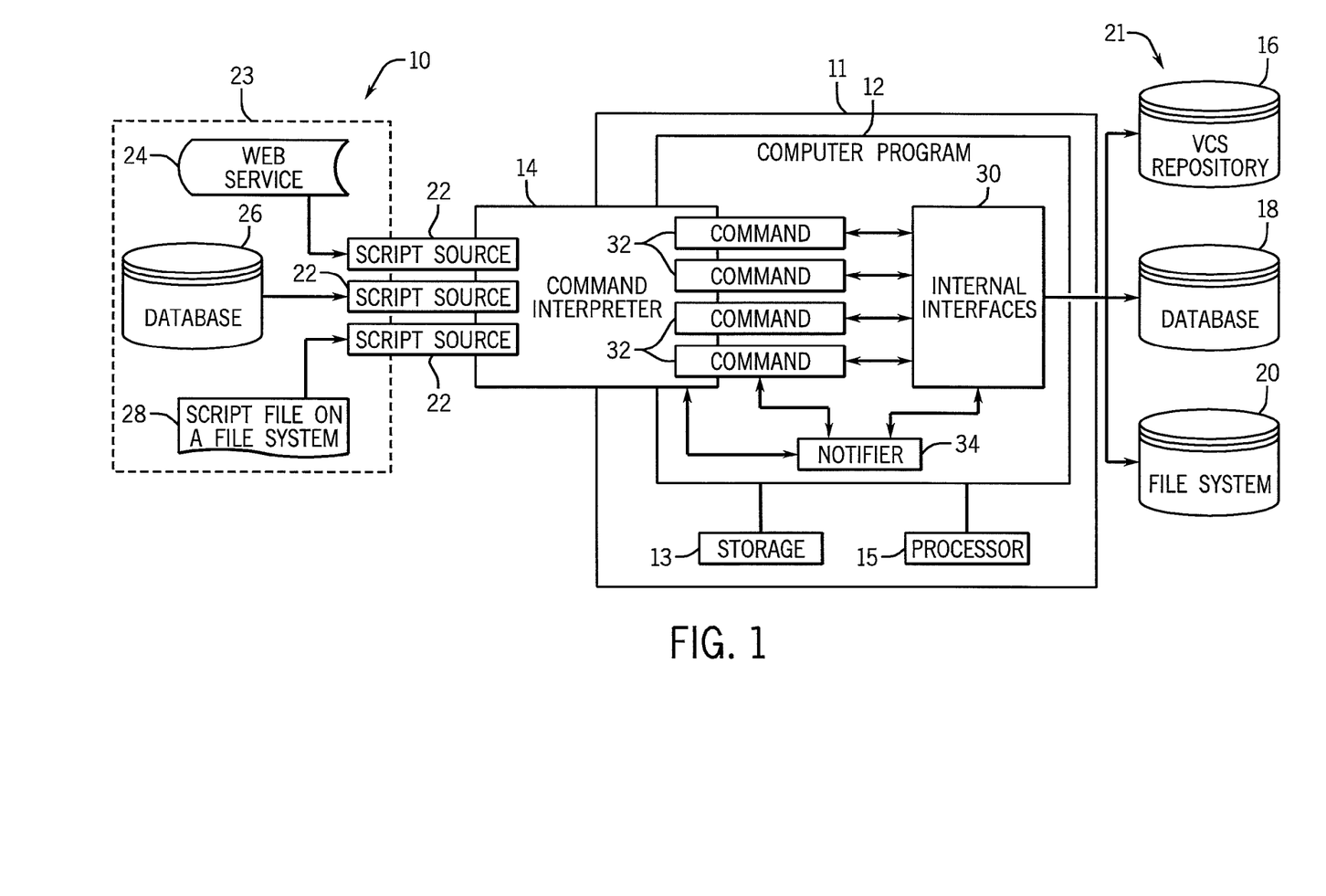
FIG. 1 is a block diagram of a computer program utilizing a command interpreter, in accordance with an embodiment.

With the foregoing in mind, FIG. 1 is a block diagram of a system 10, which includes a computer 11 that may execute a computer program 12 utilizing a command interpreter 14, in accordance with an embodiment. The computer 11 includes storage 13 and a processor 15 that may be utilized to store and execute the computer program 12 (i.e., computer-readable instructions that implement the functionality described herein). As discussed above, the computer-readable instructions (e.g., computer program 12) may not always implement all the desired features that a computer program user desires to execute. For example, the computer program 12 may be a model version manager (MVM) program that includes instructions to retain historical version information about models configured in the MVM program. The computer program 12 may include instructions to facilitate data storage in many different data stores, such as a version control repository 16, a database 18, and/or a file system 20, each of which may be contained on one or more computer storage systems (e.g., computer hard drives, storage arrays, storage servers, etc.).

Moreover, additions, deletions, and modifications to the models may be presented to the computer program in the form of jobs. Accordingly, the number of jobs presented to the computer program 12 may be quite large. For example, in certain situations, the number of jobs may be in the hundreds or thousands of jobs per day. Each of the additions, deletions, and/or modifications generated by the jobs may be stored in the data stores 16, 18, and/or 20. Over time, the amount of storage space used by the data stores may reach a size that is beyond a desirable or acceptable amount. Further, a user of the computer program may have no use for older data stored in the data stores 16, 18, and 20.

In one embodiment, the computer program 12 (e.g., MVM program) may not natively include instructions for a comprehensive purging mechanism that purges data that is no longer useful (e.g., old or stale). Accordingly, the command interpreter 14 may be incorporated into the computer program 12 so that additional functionality (e.g., enhanced data purging) may be added to the computer program 12. In one embodiment, the command interpreter 14 may include computer-readable instructions stored on the computer 11 or another computer in the computer system 10. The command interpreter 14 may receive a script file 22 in the form of text generated by a user of the computer program 12. The script file 22 may be received by the command interpreter from any data store 23 (e.g., a web service output 24 from a computer, a database 26 stored in computer storage, and/or a computer storage file system 28). The script file 22 may be generated and/or maintained by a user and/or administrator of the MVM program (e.g., an electric power company employee). The script file 22 may define functions and/or arguments (e.g., parameters) useful to implement additional functionality within the computer program 12. For example, a script 22 may include a definition generated by a computer administrator for enhanced data purging functionality that is not included in the computer-readable instructions provided in the computer program 12.

The computer program 12 may include instructions to provide one or more internal interfaces (e.g., computer-readable instructions) that allow external computers and/or computer processes to interface with the computer program 12 on the computer 11. For example, one internal interface 30 may be an application programming interface (API) of the computer program 12 running on the computer 11 that enables external computers and/or processes to execute data imports and/or exports from the computer program 12. As will be described in more detail below regarding FIG. 2, the command interpreter 14 may include instructions to generate one or more commands 32 based upon the script files 22. The commands 32 may be configured to execute functionality of the internal interfaces 30 of the computer program 12 to facilitate the functionality defined in the script files 22 (e.g., the enhanced data purging functionality).

Figure 2:
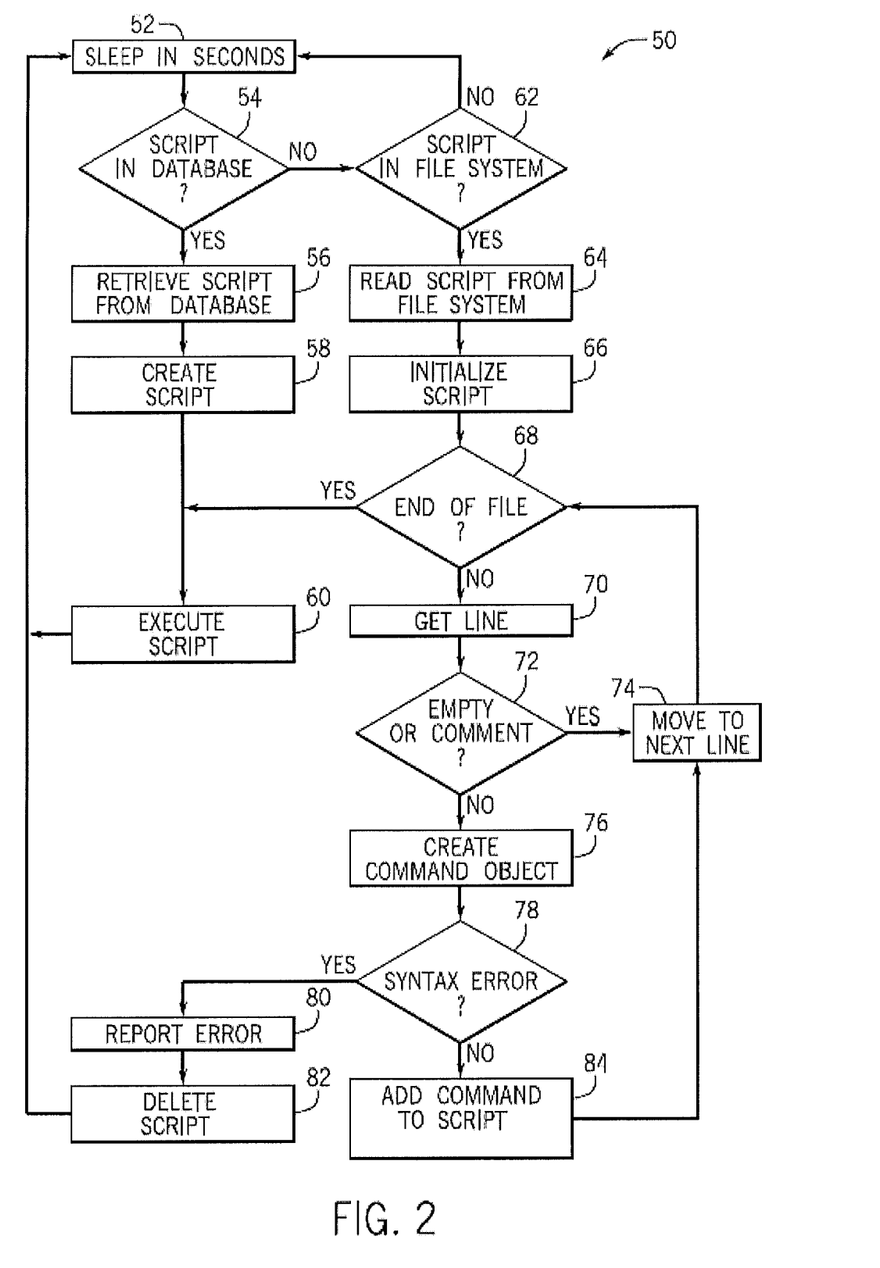
FIG. 2 is a flow diagram of a method of executing a script via the command interpreter of FIG. 1, in accordance with an embodiment.

Turning now to FIG. 2, a flow diagram is presented, illustrating a process 50 of executing a script via the command interpreter 14 of FIG. 1, in accordance with an embodiment. The command interpreter 14 may include instructions to wait a certain interval of time before processing a script (block 52). In some embodiments, the command interpreter may sleep, for example, for approximately 1, 10, 20, 50, or 60 seconds before trying to detect a script file (e.g., a user generated set of instructions defining functions and/or parameters useful for implementing additional functionality within the computer program 12 of FIG. 1).

The command interpreter may then determine whether a script is in the database by actively polling the database via a database query (block 54). If a script is found in the database, the script may be retrieved (e.g., transferred to internal storage of the command interpreter 14) (block 56). The command interpreter 14 may then generate a script containing executable commands (block 58) and execute the script (block 60). For example, the command interpreter 14 may convert the set of instructions in the script to commands interpretable by the internal interface of the computer program 12 (e.g., data imports and exports) running on computer 11.

However, if no script is found in the database at block 54, the command interpreter may detect whether a script is found in the file system by querying the file system (block 62). If no script is found, the command interpreter waits (block 52) before polling again. However, if a script file is found in the file system, the command interpreter may read the script file (block 64) and create a shell script (block 66). The command interpreter many then determine whether the end of the script file has been reached (block 68). If not, a line of text is retrieved from the script (block 70). The line of text may not be a physical line displayed on a computer screen, but may be a delimited line of text (e.g., delimited by a comma or carriage return in the script). The command interpreter determines whether the line is empty or a comment (block 72). If the line is empty or a comment, the command interpreter moves to the next line (block 74) and returns to determine whether the end of the file has been reached (block 68).

If the line obtained in block 70 is not empty or a comment, the command interpreter creates a command object based upon the text in the line (block 76). For example, the line of text may include arguments and/or procedures that are converted into commands interpretable through the internal interfaces 30 of FIG. 1. The command interpreter then detects whether a syntax error has occurred with regards to the command created in block 76 (block 78). If a syntax error is detected, the error may be reported (block 80). The reporting feature allows a user who generates a script to understand the syntax errors that arise so modified scripts may be implemented and sent to the command interpreter. Further, the script may be deleted (block 82) so that the syntax error does not negatively impact the computer program. The process then continues by waiting to re-poll for additional script files (block 52).

If, however, no syntax errors are found in block 78, the command is added to the shell script created in block 66 (block 84). The process then moves to the next line of text (block 74) and blocks 68-84 are repeated until the end of the script file is reached. Once the end of the script file is reached, the script has been populated with each line of text from the script file. Thus the script may be executed (block 60). After execution of the script, the command interpreter waits to poll for additional script files (block 52).

Figure 3:
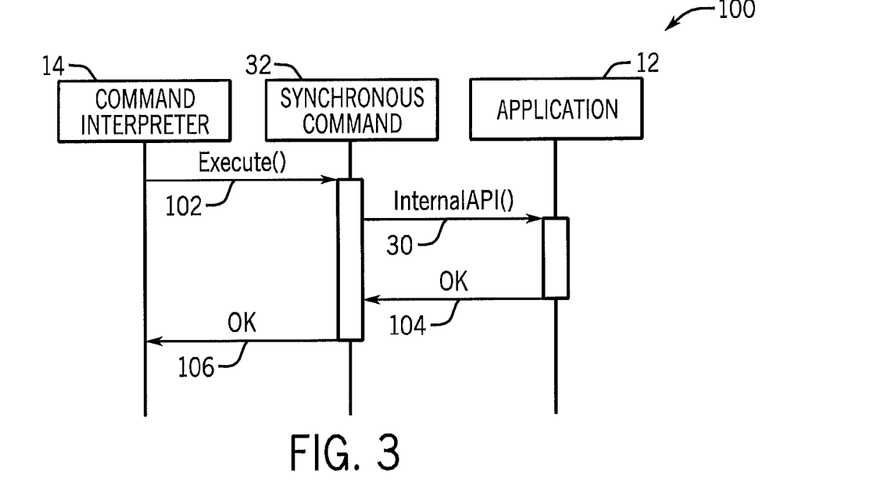
FIG. 3 is sequence diagram illustrating execution of a synchronous command generated by the script of FIG. 2 through the command interpreter of FIG. 1, in accordance with an embodiment.
Figure 4:
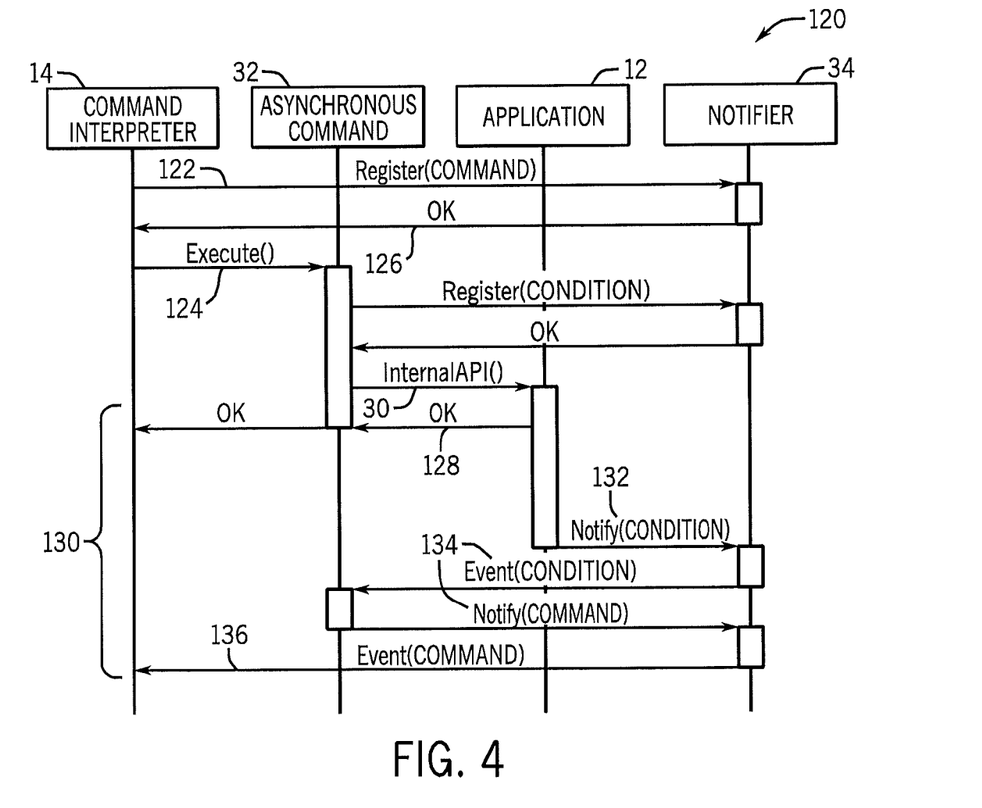
FIG. 4 is a sequence diagram illustrating execution of an asynchronous command generated by the script of FIG. 2 through the command interpreter of FIG. 1, in accordance with an embodiment.

To generate commands, the command interpreter 14 relies on the internal interface 30 of FIG. 1 to provide basic functionally that the command interpreter 14 may use to implement the functionality provided in the scripts. The internal interface 30 may include functionality that is either synchronous or asynchronous. As illustrated in FIGS. 3 and 4, the command interpreter 14 may provide commands 32 that are synchronous or asynchronous. Commands 32 that are synchronous commands are, for example, dependent on a computer program flow, and thus may be executed without concern for other events taking place in the computer program 12. Commands 32 that are asynchronous, on the other hand, occur independently of the computer program flow, and, thus, may depend on events to determine timing of their execution. Thus, to implement commands 32 that are asynchronous, a notifier module 34 may be implemented. The notifier module 34 may notify the commands 32 and/or the command interpreter 14 when certain command events occur. For example, the notifier module 34 may notify the commands 32 and/or the command interpreter 14 when a command 32 completes.

FIG. 3 is sequence diagram 100 illustrating execution of a synchronous command 32, in accordance with an embodiment. Synchronous commands 32 do not depend on events to complete execution. Thus, as illustrated if FIG. 3, the command interpreter 14 may invoke an execute method 102 of the command 32, which in turn invokes internal instructions included in the internal interfaces 30 that are associated with the command 32. Thus, computer program 12 may perform the necessary functionalities for the command 32. The computer program 12 may then return 104 to the synchronous command 32, which in turn returns 106 to the command interpreter 14.

Asynchronous commands depend on events to determine when additional commands should be executed. Thus, the completion time of commands is of direct importance. FIG. 4 is a sequence diagram 120 illustrating execution of an asynchronous command 32, in accordance with an embodiment. The command interpreter 14 registers itself 122 with the notifier 34 to be notified of COMMAND events. The command interpreter 14 invokes the execute method 124 of the asynchronous command 32. The asynchronous command 32 registers itself 126 to be notified of some event (e.g., a condition) specific to execution of the command. The asynchronous command 32 then starts asynchronous execution of the command (e.g., by invoking an asynchronous computer program-specific process through the internal interfaces 30) and then returns 128 to the command interpreter 14. The command interpreter 14 waits 130 to receive a COMMAND event from the notifier 34. Eventually, the asynchronous process in the computer program 14 completes and a particular event (e.g., the condition) is raised 132 in the notifier 34. The notifier 34 notifies 134 the asynchronous command 32 that the event (e.g., condition) has been raised. The asynchronous command 32 then raises 136 the COMMAND event in the notifier 34. The notifier 34 then notifies 136 the command interpreter 14 that the COMMAND event has been raised, thus allowing the command interpreter 14 to know that the command has completed.

Figure 5:
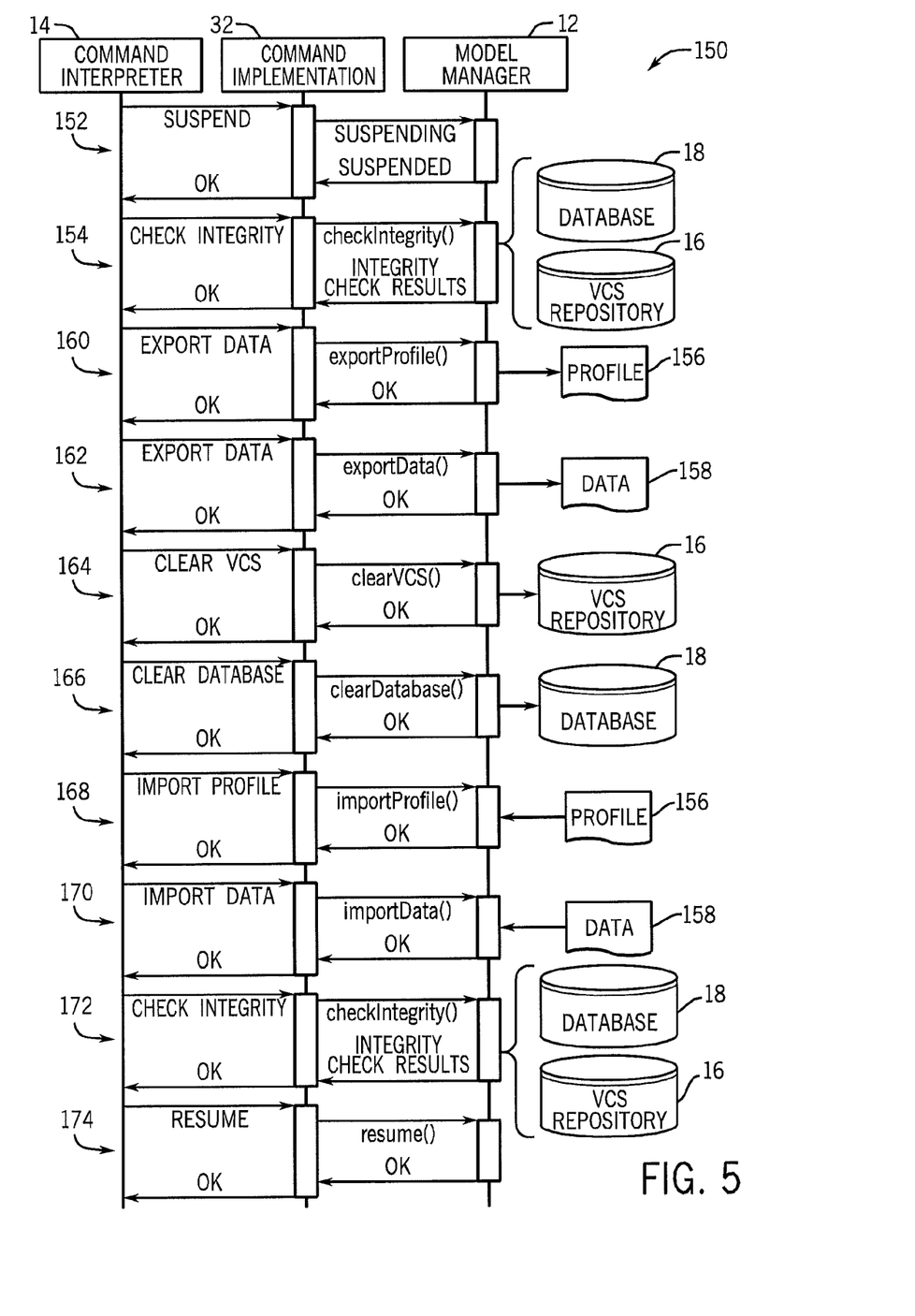
FIG. 5 is a sequence diagram illustrating execution of a script of commands, using the command interpreter of FIG. 1, to implement enhanced data purging, in accordance with an embodiment.

As previously discussed, MVM programs may utilize the command interpreter to incorporate enhanced data purging. FIG. 5 is a flow diagram 150 illustrating execution of a script of commands by the command interpreter 14 to purge data in an MVM program, in accordance with an embodiment. As discussed above, the command interpreter 14 executes commands 32 using internal interfaces 30 of the computer program 12 (e.g., an MVM program)

The command interpreter may support any extensive set of commands, however a specific set is useful for enhance purging functionality. For example, the set of commands may include a suspend command, an integrity validation command, one or more export commands, one or more clear commands, one or more import commands, and a resume command. To purge data in an MVM program, there are three broad tasks that may take place. First, useful data may be preserved. Next, the MVM program may be purged of all data. Last, the useful data may be restored.

To preserve the data, it may be useful to suspend the MVM program, such that no new jobs are accepted by the MVM program. Suspending the MVM program may help ensure that additions, deletions, and/or modifications to the data in the MVM program do not occur during data preservation process. Thus, the command interpreter 14 may execute a suspend command 152. In some embodiments, while the suspend function may block additional jobs from reaching the MVM program, jobs that reach the MVM program prior to suspension may be completed. Further, in certain embodiments, jobs that attempt to reach the MVM program subsequent to suspension may be stored in a queue and processed once the MVM program is resumed. In some embodiments, the processing of jobs in the queue may be prioritized in a first-in-first-out (FIFO) fashion.

Once the MVM program 12 is suspended and all of the jobs that reached the MVM program 12 have completed, the command interpreter 14 may execute an integrity check command 154. The version control repository 16 and the database 18 may have data dependences with one another for data, and thus may have an integral relationship. The integrity check command 154 may validate that the data in version control repository 16 and the database 18 are properly synced with one another.

Once the integrity check is complete, the command interpreter 14 may export data that is useful for the MVM program 12. The internal interfaces 30 of the MVM program 12 may include multiple export functionalities such as an exportProfile function and/or an exportData function. The exportProfile function may export profile information 156 from the MVM program 12 to a file share and/or database connected to the MVM program 12. The exportData function may export model data 158 from the MVM program 12 to a file share and/or database connected to the MVM program 12. The exportData function may include a parameter that allows a user to specify a baseline time frame. The baseline time frame signifies the earliest time for useful data. The versions of data dated before the baseline time frame will not be exported. The command interpreter 14 may execute an export data command 160 to export data in the MVM program 12, and may execute an export profile command 162 to export the MVM program 12 profile information.

Once the profile information 156 and useful data 158 is exported, the command interpreter 14 may execute a command 164 to clear the version control system repository 16. In some embodiments, the function to clear the version control system repository may completely remove the version control system repository 16 and generate a new one. In other embodiments, the function to clear the version control system repository may remove all data in the version control system repository 16, while leaving the structure of the version control system repository 16 in place.

The command interpreter 14 may also execute a command 166 to clear the database 18. In some embodiments, the function to clear the database may completely remove any data in the database relating to model information, while retaining the MVM program 14 configuration information. In other embodiments, the function to clear the database may delete and recreate all tables relating to model information, while leaving the data tables relating to configuration information untouched.

Once the version control system repository 16 and the database 18 are cleared, the command interpreter 14 may execute a command 168 to import the exported profile information 156. Further, the command interpreter 14 may execute a command 170 to import the exported model data 158. Once commands 166 and 168 are completed, the version control system repository 16 and the database 18 have been populated with only useful information as defined by the baseline time frame in the export data command.

Once all of the profiles and data are imported back into the MVM program 14, the command interpreter 14 may run another integrity check command 172 to ensure that the data in version control system repository 16 and the data in the database 18 are properly synced. Once verified, the command interpreter 14 may execute a resume command 174 to resume the MVM program 14 (e.g., allow jobs to be processed by the MVM program 14). As previously discussed, jobs that attempted to reach the MVM program 14 while it was suspended, may be taken from a queue and executed in a FIFO manner.

Technical effects of the invention include enabling expansion of a computer program to increase functionality over the designed implementation of the computer program. A user or administrator of the computer program may create a simple text based script file which is converted into machine-readable commands by a command interpreter. Specifically, the machine-readable commands may be useful to implement enhanced data purging functionalities in model version management (MVM) programs that store multiple versions of model information in data stores such as a database and a version control system repository. The enhanced data purging functions, implemented by the command interpreter, allow data that is no longer useful (e.g., old or stale) to be easily purged without requiring significant modification to the MVM programs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a computer data access component, comprising tangible non-transitory computer readable medium comprising instructions stored on a computer, the computer data access component configured to:
store data in a version control system repository, a database, a file system or combination thereof, and
provide exposed import and export operations of the version control system repository, database, file system or combination thereof to external computer programs; and
a command interpreter, comprising tangible non-transistory computer-readable medium comprising instructions stored on a computer, the command interpreter configured to execute a script using at least the exposed import and export operations, wherein the script is configured to purge content in the version control system repository, the database, or both, that was created, modified, or both prior to a date specified in the script, while retaining content in the version control system respository, the database, or both, that was generated, modified, or both after the date specified in the script.

2. The system of claim 1, wherein the computer data access component comprises a model versioning manager (MVM) program.

3. The system of claim 1, wherein the script comprises a suspend command configured to disable new jobs that may modify the data from being accepted by the computer program.

4. The system of claim 1, wherein the script comprises an integrity validation command configured to validate that the data stored in the version control system repository, the database, the file system, or combination thereof is properly synced.

5. The system of claim 1, wherein the script comprises at least one clear command configured to empty data from the version control system repository, the database, the file system, or combination thereof.

6. The system of claim 5, wherein the clear command empties the version control system repository by deleting the repository and creating a new one.

7. The system of claim 1, wherein the script comprises a resume command configured to enable new jobs that may modify the data to be accepted by the computer program.

8. A method of purging data, comprising:
detecting, via a command interpreter implemented on a first computer, a script file;
generating, via the command interpreter implemented on the first computer, a command script comprising tangible machine-readable instructions stored in a data storage to:

suspend a computer program, running on the first computer or a second computer, such that jobs sent to the computer program are not executed, determine what data related to the computer program should be preserved, export the data that should be preserved, delete all database tables and version control repositories not relating to configuration of the computer program, database tables, and version control repositories, import the exported data, and resume the computer program so that jobs sent to the computer program may be executed; and executing, via the command interpreter, the command script.

9. The method of claim 8, wherein the command script comprises tangible machine-readable instructions stored in the data storage to check the integrity of the data prior to exporting the data, check the integrity of the data after the data is imported, or a combination thereof.

10. The method of claim 8, comprising storing jobs sent to the computer program while the computer program is in a suspended state to a queue.

11. The method of claim 10, comprising executing the jobs in the queue subsequent to resuming the computer program.

* * * * *

UNITED STATES PATENT AND TRADEMARK OFFICE
CERTIFICATE OF CORRECTION

PATENT NO. : 8,892,519 B2  
APPLICATION NO. : 13/267843  
DATED : November 18, 2014  
INVENTOR(S) : San Andres et al.

It is certified that error appears in the above-identified patent and that said Letters Patent is hereby corrected as shown below:

In the specification

In Column 1, Line 39, delete "consuming Thus," and insert -- consuming. Thus, --, therefor.

In Column 6, Line 15, delete "program 14" and insert -- program 12 --, therefor.

In Column 6, Line 60, delete "control repository" and insert -- control system repository --, therefor.

In Column 6, Line 64, delete "repository" and insert -- system repository --, therefor.

In Column 7, Line 31, delete "program 14" and insert -- program 12 --, therefor.

In Column 7, Line 46, delete "program 14," and insert -- program 12, --, therefor.

In Column 7, Line 51, delete "program 14" and insert -- program 12 --, therefor.

In Column 7, Line 52, delete "program 14)." and insert -- program 12). --, therefor.

In Column 7, Line 53, delete "program 14" and insert -- program 12 --, therefor.

Signed and Sealed this  
Twenty-second Day of March, 2016

Michelle K. Lee  
*Director of the United States Patent and Trademark Office*